(12) United States Patent
Polk, Jr. et al.

(10) Patent No.: US 10,626,621 B2
(45) Date of Patent: Apr. 21, 2020

(54) METHOD AND APPARATUS FOR CONSTRUCTION MATS

(71) Applicant: D & D Manufacturing, LLC, Rockledge, FL (US)

(72) Inventors: Dale E. Polk, Jr., Titusville, FL (US); Timothy A. Polk, Mims, FL (US)

(73) Assignee: D & D Manufacturing, LLC, Rockledge, FL (US)

( * ) Notice: Subject to any disclaimer, the term of this patent is extended or adjusted under 35 U.S.C. 154(b) by 0 days.

(21) Appl. No.: 16/276,977

(22) Filed: Feb. 15, 2019

(65) Prior Publication Data
US 2019/0257093 A1    Aug. 22, 2019

Related U.S. Application Data

(60) Provisional application No. 62/631,548, filed on Feb. 16, 2018.

(51) Int. Cl.
| | | |
|---|---|---|
| E04F 15/22 | (2006.01) |
| E04F 15/02 | (2006.01) |
| E01C 9/08 | (2006.01) |
| E04F 15/10 | (2006.01) |
| F16B 37/00 | (2006.01) |
| F16B 5/02 | (2006.01) |
| F16B 41/00 | (2006.01) |
| F16B 5/00 | (2006.01) |
| F16B 37/04 | (2006.01) |
| F16B 33/02 | (2006.01) |

(52) U.S. Cl.
CPC ........ *E04F 15/02044* (2013.01); *E01C 9/086* (2013.01); *E04F 15/107* (2013.01); *F16B 5/0088* (2013.01); *F16B 5/025* (2013.01); *F16B 5/0225* (2013.01); *F16B 37/002* (2013.01); *F16B 41/002* (2013.01); *E04F 2201/05* (2013.01); *F16B 5/02* (2013.01); *F16B 33/02* (2013.01); *F16B 37/044* (2013.01)

(58) Field of Classification Search
CPC .............. E04F 15/02044; E04F 15/107; E04F 2201/05; E04F 2015/02077; F16B 5/02; F16B 33/02; F16B 37/044; E01C 9/086; Y10T 428/24149
USPC .... 52/403.1, 177, 124.4; 404/34, 35, 44, 36, 404/41, 42; 428/116
See application file for complete search history.

(56) References Cited

U.S. PATENT DOCUMENTS

| | | | | |
|---|---|---|---|---|
| 5,776,582 A | * | 7/1998 | Needham | .................. B32B 3/06 428/116 |
| 6,511,257 B1 | * | 1/2003 | Seaux | ...................... E01C 9/086 |
| 6,649,110 B1 | | 11/2003 | Seaux et al. | |
| 6,695,527 B2 | | 2/2004 | Seaux et al. | |
| 6,722,831 B2 | | 4/2004 | Rogers et al. | |
| 7,299,592 B2 | * | 11/2007 | Moller, Jr. | ........ E04F 15/02172 52/177 |

(Continued)

*Primary Examiner* — Chi Q Nguyen
(74) *Attorney, Agent, or Firm* — Michael A. Ervin; M. A. Ervin & Associates

(57) ABSTRACT

This disclosure relates to a modular construction mat system wherein each individual mat is made of two layers to support heavy loads while providing stability and ground protection. In use the finished mats can then be adjoined to adjacent mats to complete a large mat system for roadways, walkways, and other support structures using a unique floating nut system to create a single firmly joined modular mat system.

7 Claims, 10 Drawing Sheets

(56) References Cited

U.S. PATENT DOCUMENTS

| | | | |
|---|---|---|---|
| 7,779,595 B2 | 8/2010 | Polk, Jr. | |
| 7,980,042 B2 | 7/2011 | Polk, Jr. | |
| 8,091,314 B2 | 1/2012 | Polk, Jr. | |
| 8,414,217 B2 | 4/2013 | Rosan | |
| 9,249,570 B2 * | 2/2016 | Jean | E04B 5/023 |
| D832,968 S * | 11/2018 | Martin | D21/826 |
| 2007/0137129 A1 * | 6/2007 | Sondermann | E04B 1/681 52/395 |
| 2014/0270945 A1 * | 9/2014 | Bach | E01C 5/20 404/36 |
| 2015/0096250 A1 * | 4/2015 | Lam | E04F 15/02038 52/403.1 |
| 2016/0301161 A1 * | 10/2016 | McDowell | H02B 13/025 |
| 2018/0030666 A1 * | 2/2018 | Penland, Jr. | E01C 9/086 |

\* cited by examiner

METHOD AND APPARATUS FOR CONSTRUCTION MATS

CROSS-REFERENCE TO RELATED APPLICATIONS

This application claims the benefit of U.S. Provisional application 62/631,548 filed Feb. 16, 2018. The aforementioned patent application is hereby incorporated by reference in its entirety into the present application to the extent consistent with the present application.

BACKGROUND

Heavy duty modular flooring systems of various designs have been utilized for a significant period of time to provide a temporary and rigid surface in remote or inaccessible areas. More particularly, such systems are primarily utilized in settings where a firm and stable surface is temporarily needed, such as industrial or construction areas. With respect to industrial or construction areas, temporary flooring may be utilized to provide walkways, driveways, parking areas or other rigid surfaces for the transport of materials, vehicles, storage or mounting of equipment. The modular nature of such flooring is utilized to adapt the flooring to the particular topographic or geographic needs of the particular site and to also allow for the efficient storage and transport of the modular flooring. In addition, the use of relatively small modular floor mats permits repairs and disposal of broken floor sections with relative ease.

Traditional materials for the construction of temporary roadways or construction support surfaces included wood boards or planks. This method generally requires the use of a large number of boards attached with nails, screws, or bolts in a side-by-side manner. Positioning and removal of the planks is time consuming and labor intensive and may require cranes and other equipment. The wooden boards are also susceptible to cracking and warping due to the excessively heavy loads encountered in construction sites and environmental factors such as rain. Water may pass through the seams or spaces between the boards onto the surface below producing a muddy condition. The use of heavy equipment on mud causes damage to the subsurface as well as the equipment in use and can make a work area unsafe or unsanitary.

Because such a large number of individual wooden boards are generally required to construct a typical roadway or equipment support surface, the use of wooden boards can be very labor intensive, since each board must first be individually positioned, and thereafter nailed or otherwise secured in place. Removal of the individual boards can also be a very time consuming and labor intensive process, since each board must be separated or pulled apart prior to being removed from the location. Each individual board must also be loaded onto a truck or other means of transportation prior to being removed from the particular location or work site.

The shortcomings of wooden systems has led to various attempts to use various molded plastic mat systems. These also attempt to address another shortcoming with existing mat systems, the failure of individual mats to lock or interconnect with one another on all sides. Because the intended use of the mats dictates that the roadway or support surface will be subjected to loading from heavy equipment, often in different lateral directions, it is advantageous for individual mats to interconnect on all sides. This will prevent the individual mats from separating or "walking apart" from one another, and will promote a continuous and uniform work surface. One approach that has been used is the application of rotating cam locks to provide the locking mechanisms of the mats. These add both weight and cost to the mat.

The disclosure described herein addresses many of the aforementioned issues with existing construction mat systems.

SUMMARY OF THE DISCLOSURE

A modular construction mat system that may include at least: a substantially rectangular upper layer mat having an upper layer top, an upper layer bottom, a first plurality of walls extending downwardly from the upper layer bottom which define a plurality of upper layer enclosed cells; a substantially rectangular lower layer mat having a lower layer top, a lower layer bottom, a second plurality of walls extending upwardly from the lower layer top which define a plurality of lower layer enclosed cells; a plurality of stanchions, which are shown as substantially circular extending downward from the lower surface of the upper layer, wherein the stanchions fit within some of the plurality of upper layer enclosed cells; a plurality of stanchions extending upward from the upper surface of the lower layer, wherein the stanchions fit within some of the plurality of lower layer enclosed cells; a lower layer upwardly extruded feature traversing in one direction along some of the top edges of some of the plurality of lower layer enclosed cells; the upwardly extruded feature configured to be inserted into a corresponding receiving pocket traversing in the same direction along some of the bottom edges of some of the plurality of upper layer enclosed cells; an upper layer downwardly extruded feature traversing in one direction along some of the bottom edges of some of the plurality of upper layer enclosed cells; the downwardly extruded feature configured to be inserted into a corresponding receiving pocket traversing in the same direction along some of the top edges of some of the plurality of lower layer enclosed cells; a floating nut system for affixing the top of the upper layer to the bottom of the lower layer, wherein the mats are offset relative to one another such that one edge of the upper layer forms a lower peripheral extension along two adjacent sides, and one edge of the lower layer forms an upper peripheral extension along the remaining two sides, and the vertical walls of the upper layer are aligned with the vertical walls of the lower layer.

DETAILED DESCRIPTION

Figure 1:
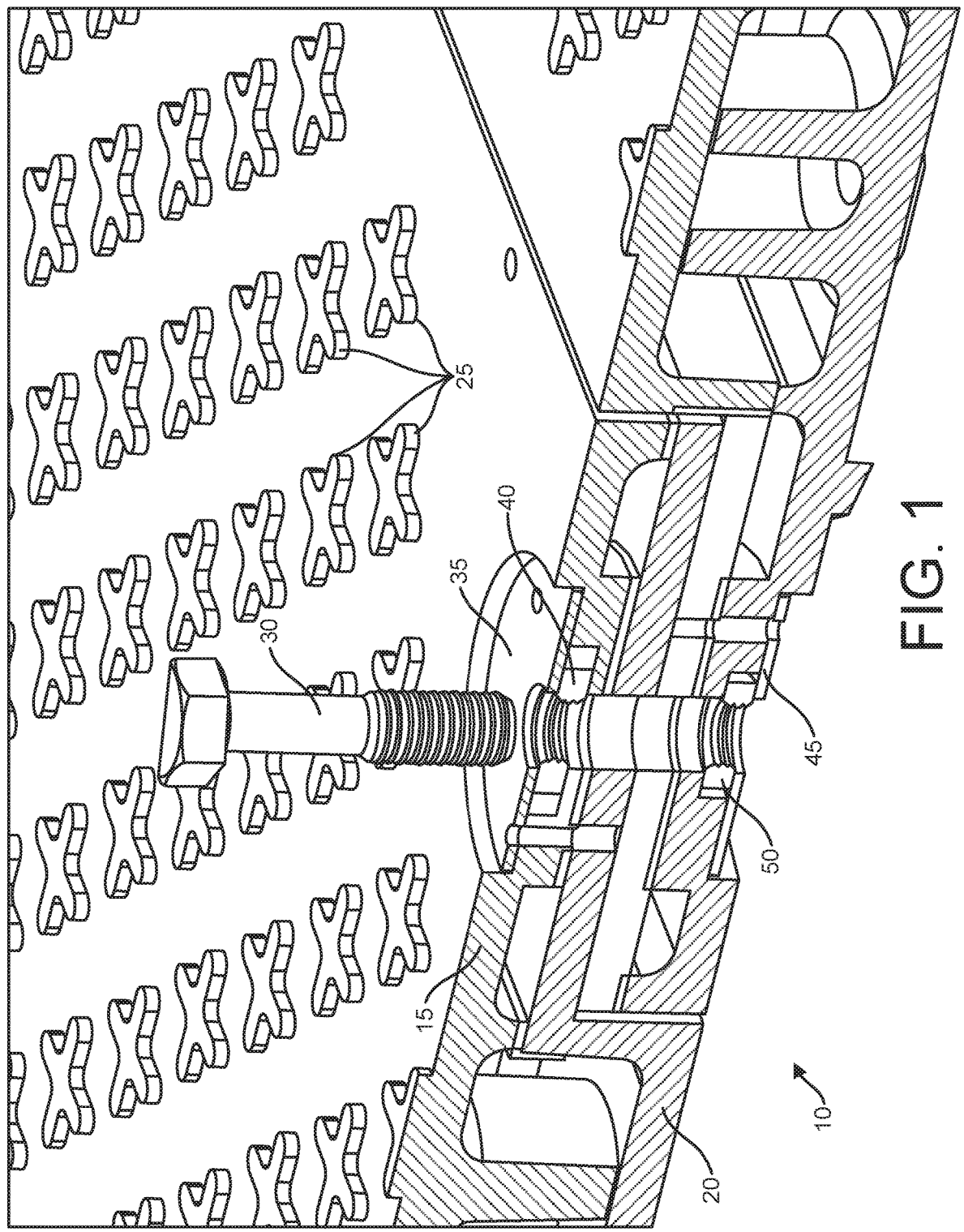
FIG. 1 is an illustration of the floating nut system and its relationship to the layered construction mat structure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Referring first to FIG. 1, a complete mat 10, consisting of an upper 15 and a lower 20 layer section is illustrated. The upper surface shown in this example will be referred to a pedestrian surface, with enough roughage from the repeated features 25 to provide a non-slippery walking surface under wet or muddy conditions. An alternate embodiment of a more rugged surface will be shown in later figures. This more rugged surface is designed more for heavy vehicle traffic on the mat. The completed mat 10 can be easily prepared in any combination of pedestrian or rugged surfaces based on the application of individual customers.

The resulting mats may have a wide range of dimensions, which may depend, at least in part, on the particular application the load bearing assembly is used in. The width and length of the mats may be the same, in which case the mat is substantially square. Alternatively, the width and length of the mat may be different, in which case the panel is substantially rectangular.

The mats of this disclosure can be easily joined with adjacent mats using a uniquely designed floating nut system shown in FIG. 1. The floating nut comprises a unique bolt 30, a top layer floating nut retainer plate 35, an upper captured floating nut 40, a lower layer floating nut retainer plate 45, and a lower captured floating nut 50. The floating nut system will be described in more detail in subsequent figures.

Figure 2:
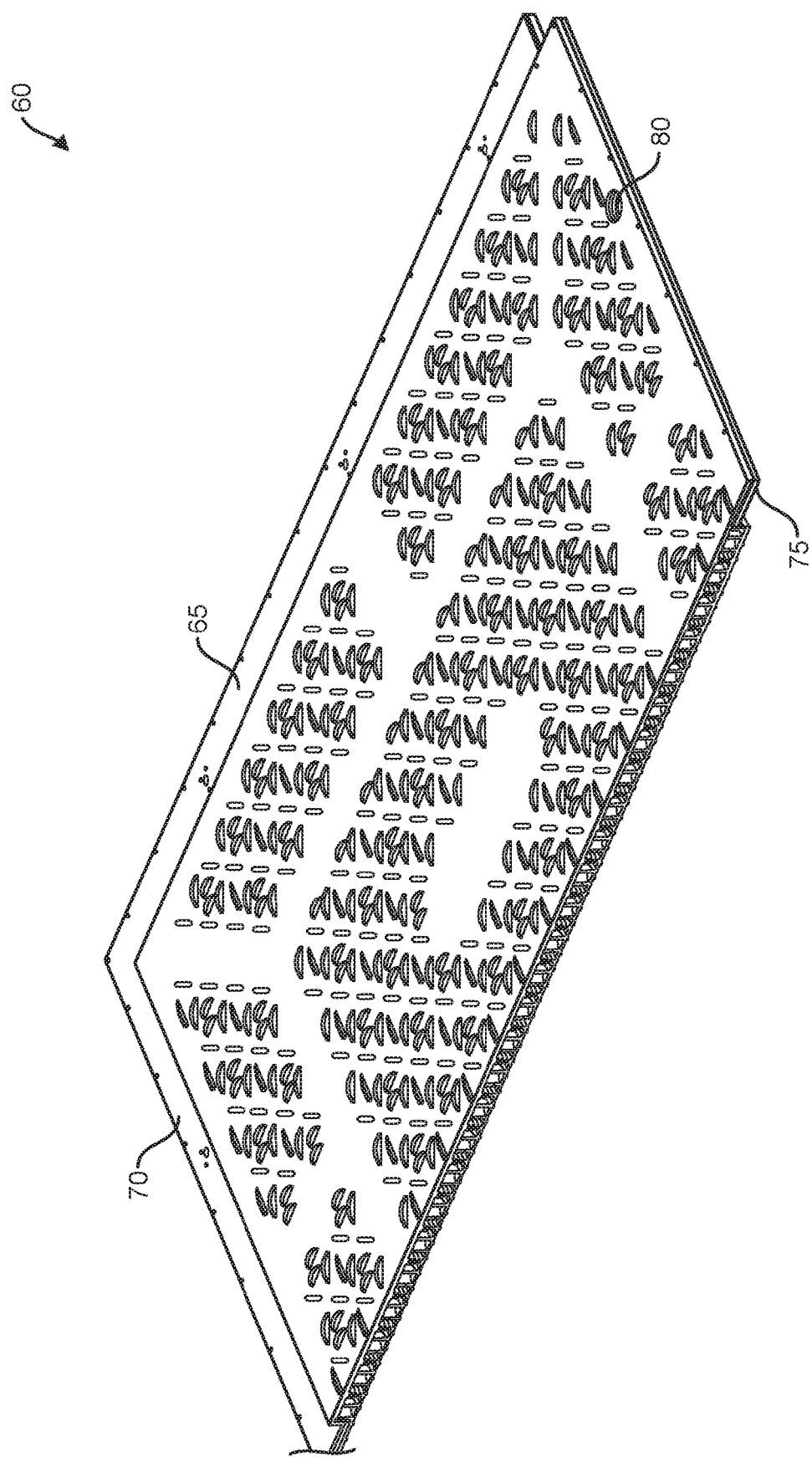
FIG. 2 illustrates a cross section of a single completed mat, made up of an upper and lower layer mat as described in FIG. 1.

FIG. 2 illustrates a cross section of a single completed mat 60, made up of upper 15 and lower 20 layer mats as described in FIG. 1. The two layers can be affixed by a variety of means. For example they can be glued together, or attached together by screws, nuts, or rivets. Other methods used can be heat sealing, or thermal welding. If glue is used adhesives may be selected from a wide range of adhesives known to the skilled artisan.

Furthermore, various combinations of the above can be used. Illustrated in FIG. 2 is a top plan of an individual mat having an upper layer and a lower layer. The proposed configuration results in lower peripheral extensions 65, 70 on two adjacent edges of lower layer of mat 60. An upper layer peripheral extension 75 is shown from the upper layer of mat 60 and would have another upper layer extension (not shown) on the remaining two adjacent edges of mat 60, which is not visible because the drawing is a cross section. The extensions enable the straightforward joining of adjacent mats. When two individual mats are placed together for purposes of constructing a pathway or roadway for example, a lower peripheral extension 70 of one mat is placed under an upper peripheral extension 75 of an adjacent mat. Similarly, in the other direction, lower peripheral extension 65 of one mat is placed under an upper peripheral extension of an adjacent mat and they are joined by use of multiple floating nut systems, as illustrated by floating nut system 80.

Also exhibited in FIG. 2 is an upper surface of mat 60 with a more rugged surface for applications engaging heavier vehicular traffic. As previously mentioned the choice of a pedestrian versus a rugged surface can be chosen for each of the upper and lower layers based on particular customer applications.

Prior art construction mat systems have used a variety of techniques for joining adjacent mats in the field. As vehicles travel across roadways or other support surfaces constructed from construction mat systems, mats of conventional mat systems can have a tendency to pull or "walk apart" from one another. Various fasteners have been used, including receptacles and bolts. In another approach the mats are joined by aluminum cam locks. In this disclosure, as mentioned previously the proposal is to use unique floating nut systems, found to be especially useful for construction mats.

Floating nuts or floating nut plates are specialized connector systems to provide a high float fastener which will maintain preload while permitting joint movement. They offer ease of use and maintenance as well as allowing slight misalignment. Different configurations of nut elements can be used. These are especially useful for construction mat systems.

Figure 3:
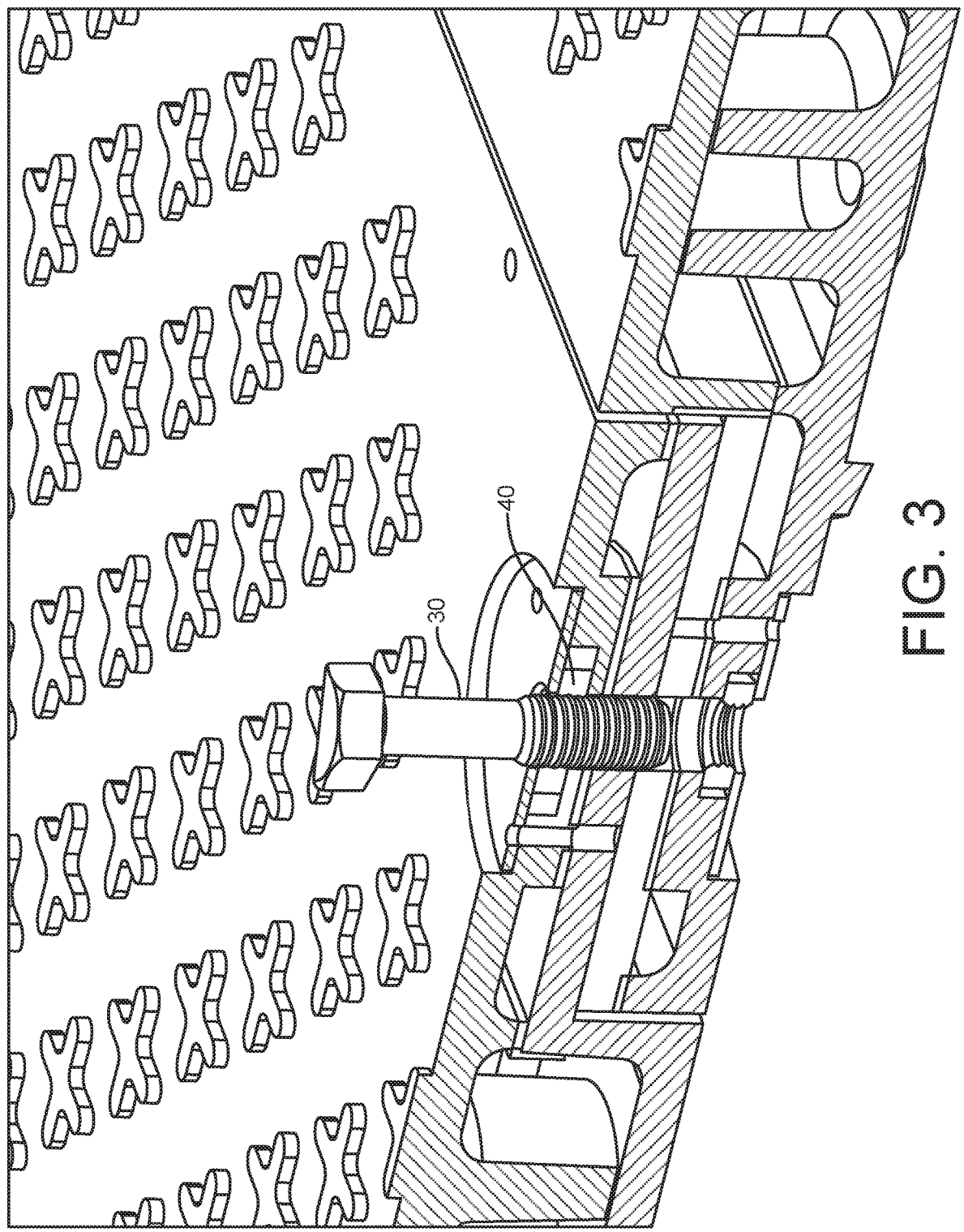
FIG. 3 is a second illustration of the floating nut system showing how the nut screws through an upper captured floating nut.

FIG. 3 illustrates the floating nut system of FIG. 1 wherein the bolt 30 has been screwed down part way through the captured floating nut 40.

Figure 4:
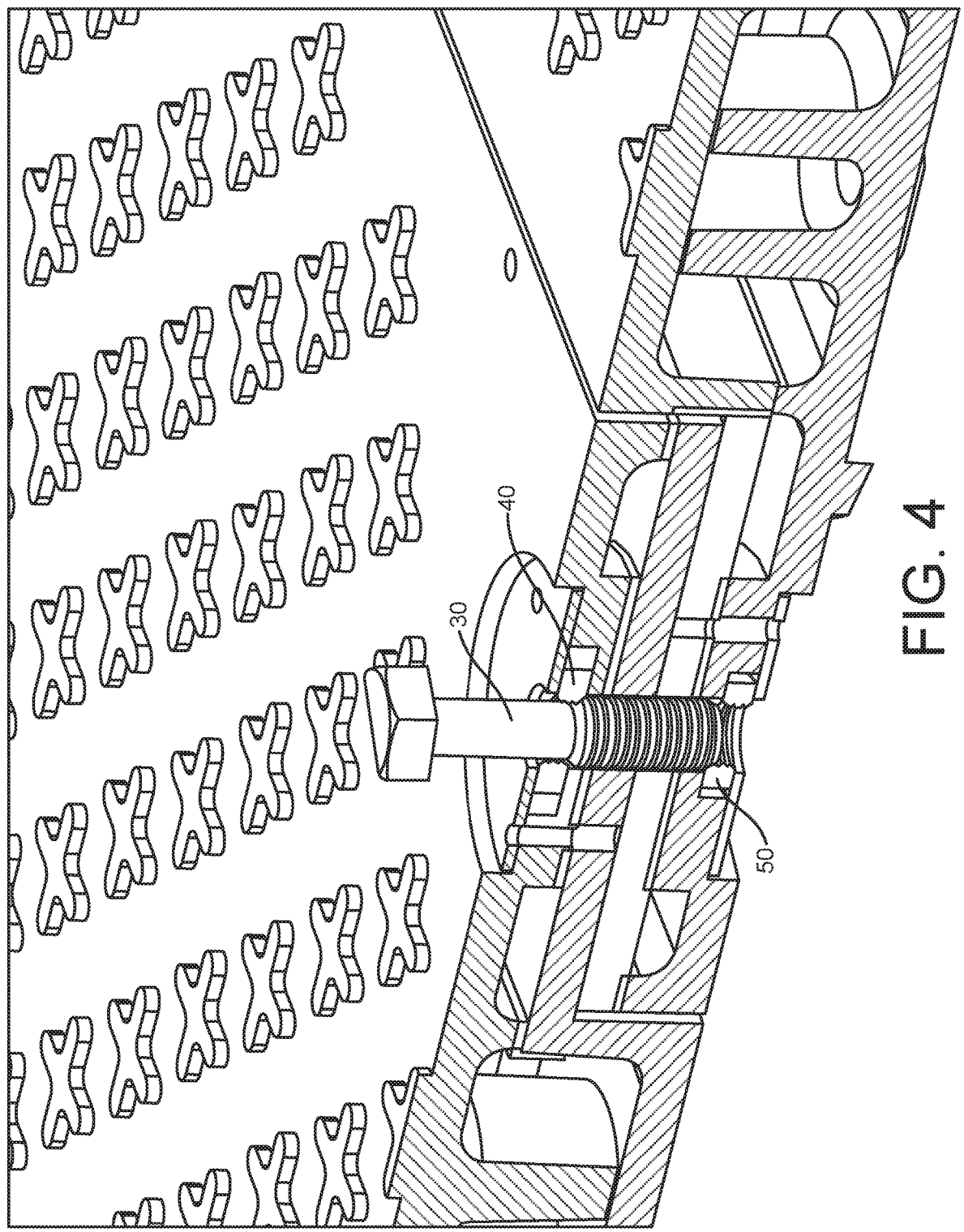
FIG. 4 is a fourth illustration of the floating nut system showing how the bolt drops down through the top nut and into the lower nut.

FIG. 4 illustrates the bolt 30 now screwed completely through the upper captured floating nut 40 and drops into the lower captured floating nut 50.

Figure 5:
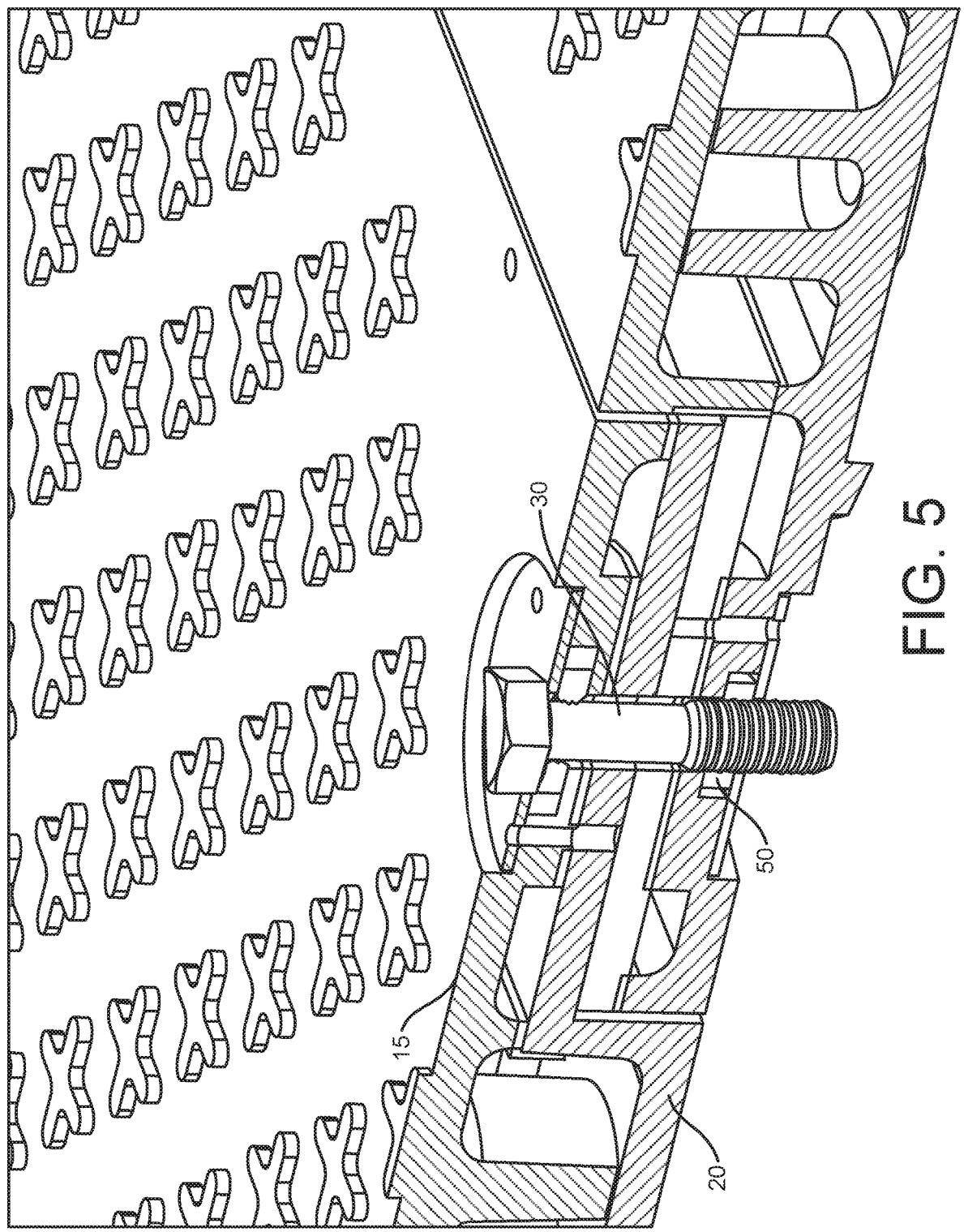
FIG. 5 illustrates how the nut is finally tightened slightly to join adjacent layered mats (adjacent mat not shown).

FIG. 5 finally illustrates bolt 30 tightened down by screwing further into the lower layer captured floating nut 50 installed into the lower layer mat 20. In this configuration the complete mat is ready to ship, and the complete floating nut system is shipped with the mats to the end user. In this approach the complete floating nut systems, which will be several floating nuts per mat, will always be part of the mats, so that the end user does not have to apply the floating nuts independently in the field. The floating nut systems can then readily be used to connect adjacent mats to each other by simply joining adjacent mats as described in the discussion of FIG. 2 and using the floating nut systems to firmly join adjacent mats in a desired horizontal configuration. The use of the floating nut systems in this manner thus not only joins adjacent mats in the field but helps firmly hold the upper and lower layer mats together.

The proposed floating nut system has several distinct advantages over alternates such as aluminum cam locks. The bolt is held captive, already installed before shipment, therefore cannot be lost in the field. The floating nut allows mats to not be "perfect" in alignment when mating. The is a huge advantage in working on uneven grounds—and the applications involved always have to deal with uneven ground. Attachment is much faster. There is greater strength and durability, steel bolts versus a cast aluminum cam. And costs are lower.

Figure 6:
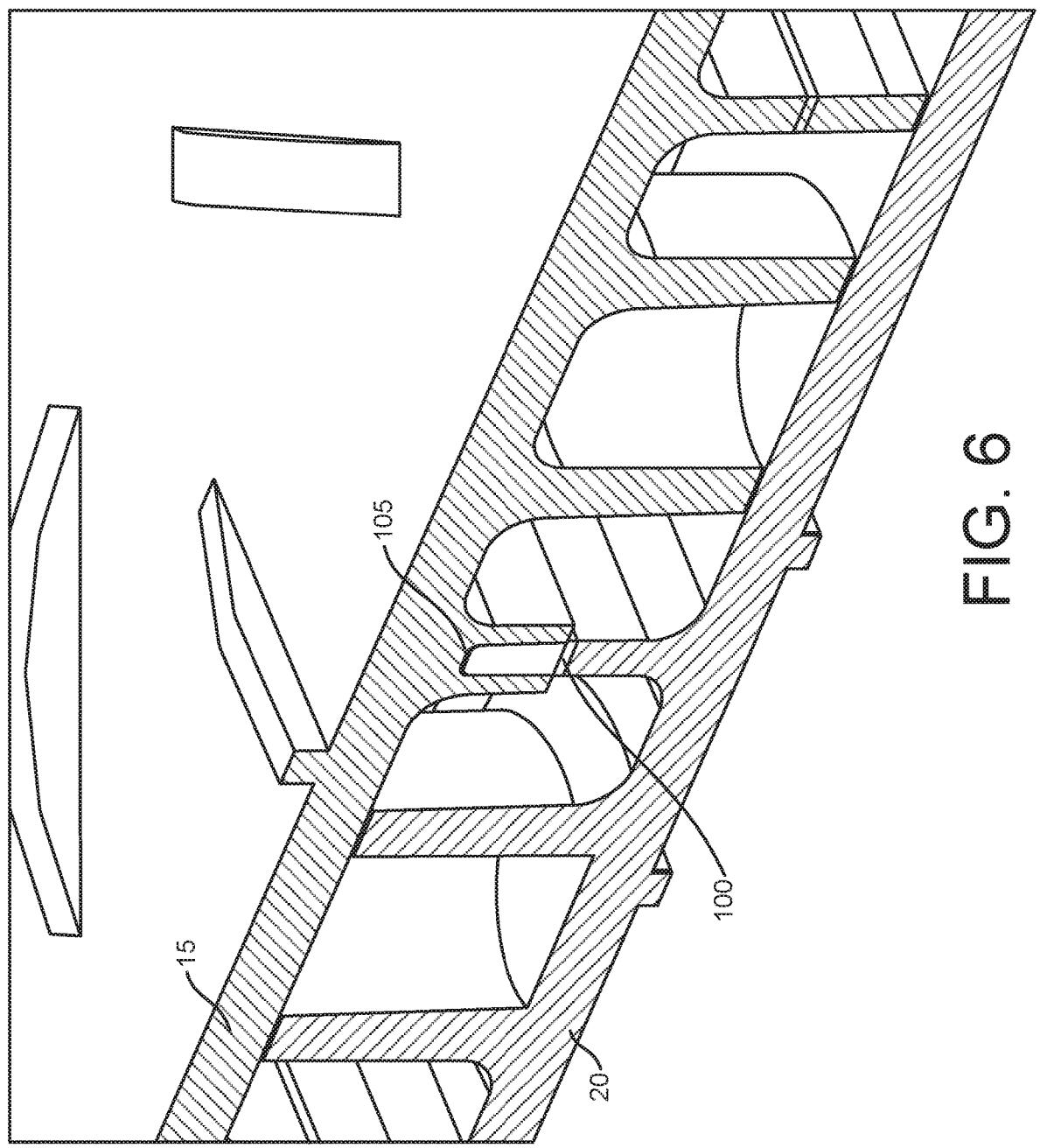
FIG. 6 is a side view of the upper and lower layer mats illustrating how the extruded features from the lower mat fit into the receiving pockets in the upper mat.

FIG. 6 illustrates how an upper layer 15 and lower layer 20 mat can be joined together using extruded features 100 from the lower layer that fit into receiving pockets 105 on the upper layer. These could be glued in place also. The use of adhesives depends on the plastic being used. Some plastics are much easier to hold together with adhesives than others. In this view we are seeing the lower mat along the long side of the mat. As mentioned previously the upper and lower layers can also be held together by the use of screws, nuts, rivets, heat sealing, or thermal welding.

Figure 7:
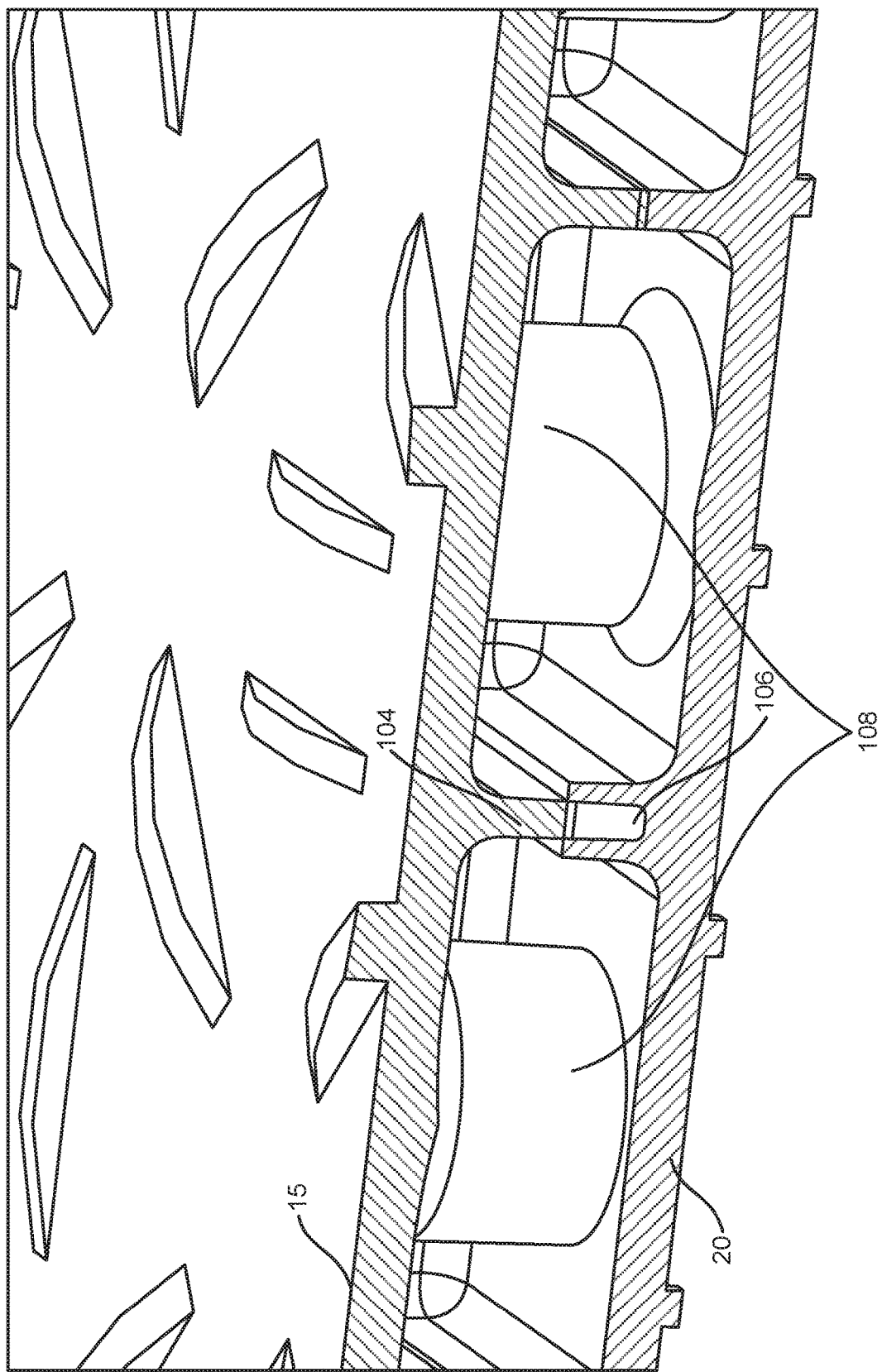
FIG. 7 is another side view of the upper and lower mats illustrating the case in which the extruded features from an upper mat fit into the receiving pockets in the lower mat. It also illustrates stanchions that provide support between the upper and lower mat.

FIG. 7 illustrates how an upper layer 15 and lower layer 20 mat can be joined together using extruded features 104 from the upper layer that fit into receiving pockets 105 on the lower layer. These could be glued in place also. The use of adhesives depends on the plastic being used. Some plastics are much easier to hold together with adhesives than others. In this view we are seeing the lower mat along the long side of the mat. As mentioned previously the upper and lower layers can also be held together by the use of screws, nuts, rivets, heat sealing, or thermal welding. In this view we are seeing the lower mat along the short side of the mat.

Also in the view of FIG. 7 we can now clearly see two of the many substantially circular stanchions 108 that are molded into place across the mat to provide additional strength. Every other stanchion is molded into either the lower or upper mat. The multitude of stanchions can be clearly seen in the next Figure. Note that the stanchions can be other than circular without losing their functionality.

Figure 8:
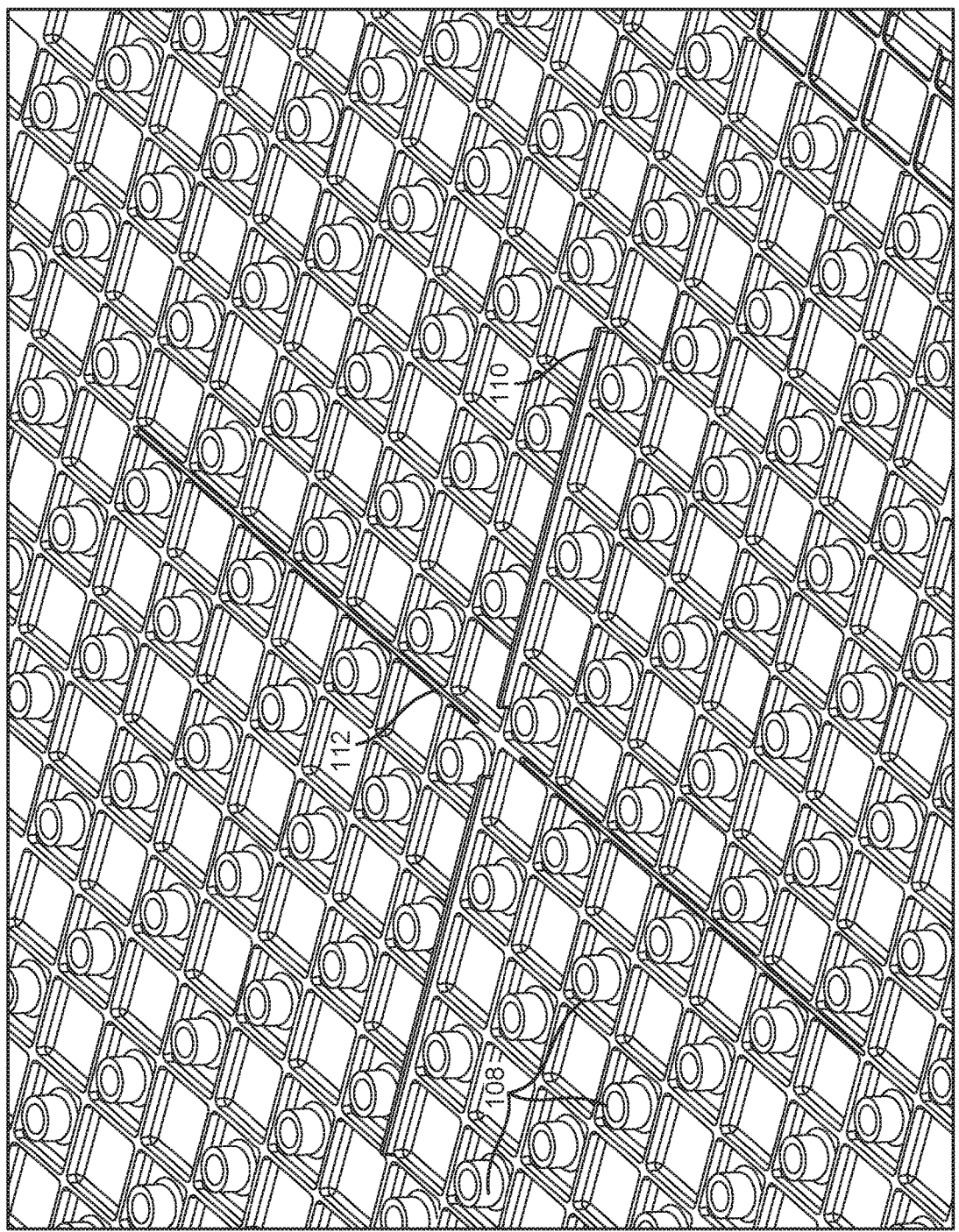
FIG. 8 illustrates examples of extruded features on the lower layer mat and the pockets on the lower layer mat for receiving the extruded features from the upper layer as well as the numerous stanchions inside the enclosed cells formed by the substantially vertical walls on the lower layer mat.

FIG. 8 illustrates examples of extruded features 110 on the lower layer mat and the pockets 112 on the lower layer mat for receiving the extruded features from the upper layer as well as the numerous substantially circular stanchions 108 inside the enclosed cells formed by the walls on the lower layer mat. These walls are shown as substantially vertical because that simplifies the construction of the mats but that is not an absolute requirement. Note again that the stanchions shown do not have to be circular to provide support. This figure also illustrates the many enclosed cells created by the walls coming up from the lower layer mat. Not shown because FIG. 8 is of a lower mat is a view of the enclosed cells and stanchions that are coming down from the upper mat. As the upper mat is placed upon the lower mat the stanchions from the upper mat will fill the empty enclosed cells of the lower mat, and the upper layer mat enclosed cells will accept the stanchions of the lower mat.

Figure 9:
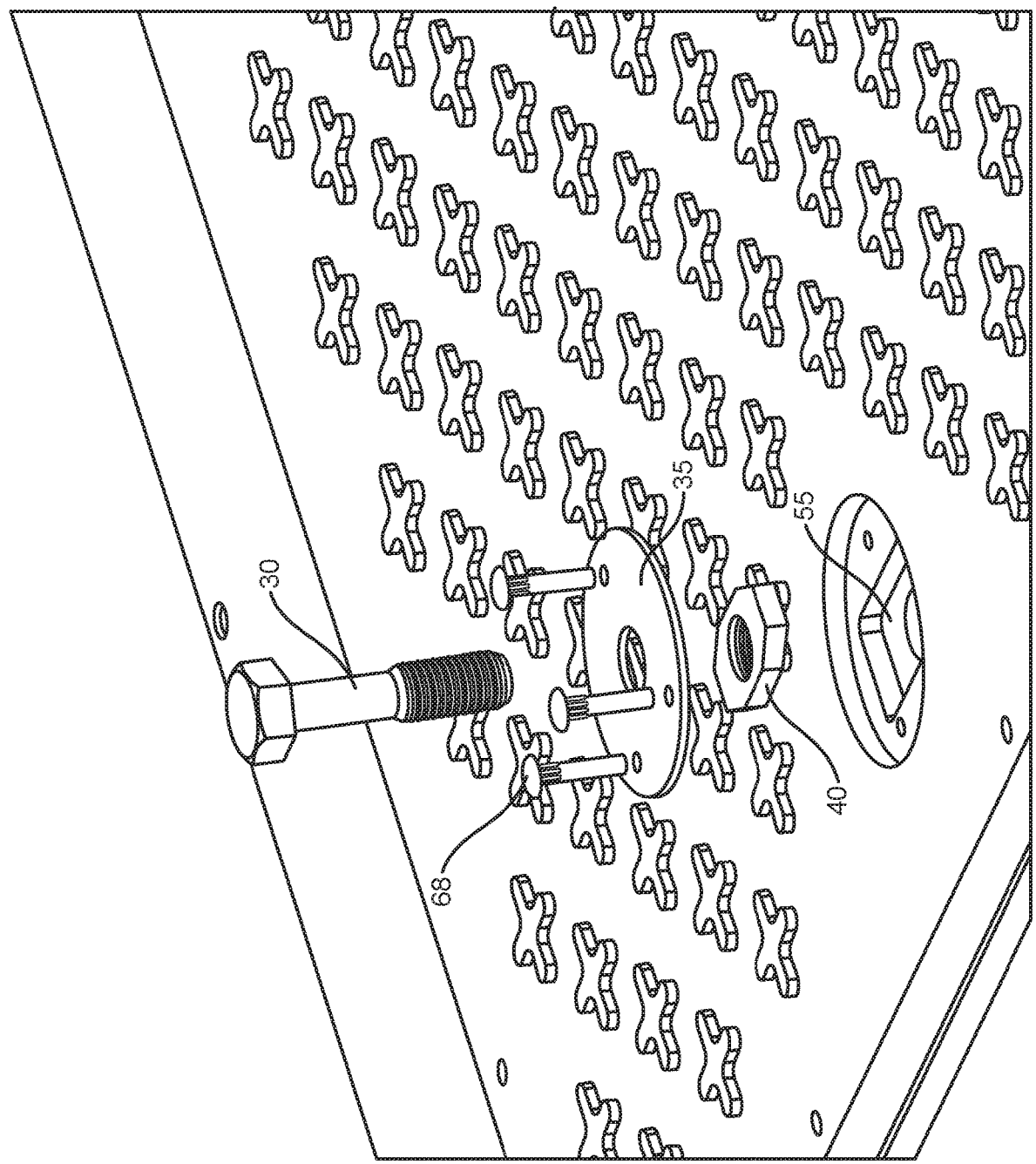
FIG. 9 shows an expanded version of the floating nut system to illustrate how it is fitted into the construction mat.

FIG. 9 returns to the floating nut system in an exploded view on an upper layer of the mat to illustrate its functionality. The floating nut 40 drops down into a receiving receptacle 55 where it has some limited but crucial freedom to move as the mat system is put under loads. The floating nut is then captured by a floating nut retainer plate 35 fastened into the mat by bolts or screws 68. The major bolt 30 is then used to be screwed down into the floating nut system. The complete floating nut system consists also of a matching captured floating nut (50 in FIG. 1) available from the lower layer of the mat.

Figure 10:
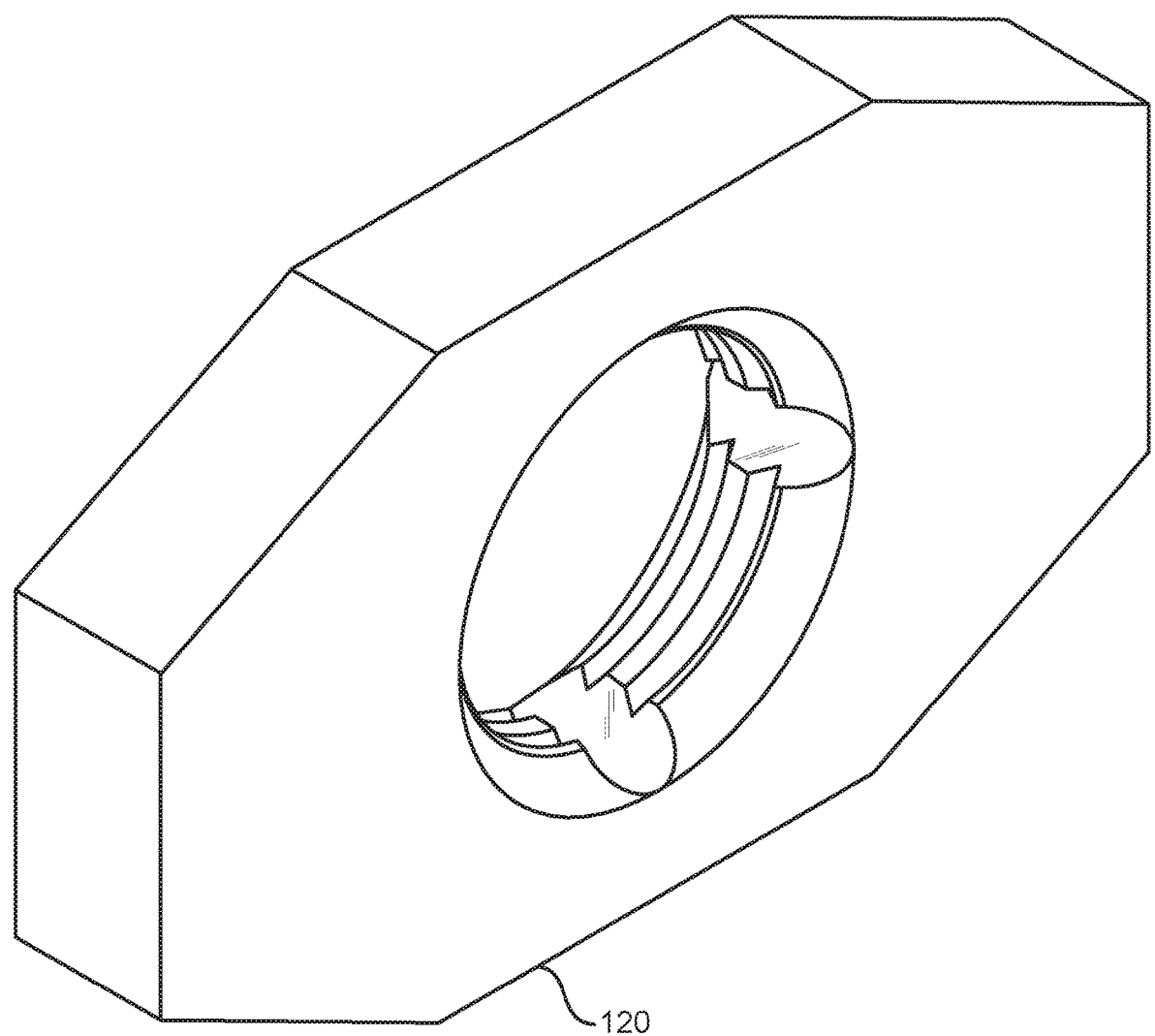
FIG. 10 illustrates an alternate embodiment of the floating nut with a nut design that allows self-cleaning.

A further possible embodiment of the floating nut system is an improved floating nut embodiment illustrated in FIG. 10. The floating nut 120 illustrated allows the nut to be self-cleaning. This can be very important in the environment in which construction mats are used, in which the mats are routinely subjected to trash, mud and water. In this embodiment the floating nut 40 previously shown in FIG. 9 is replaced by a redesigned floating nut 120 which has multiple grooves traversing the threads of the floating nuts. In the illustration here there are two visible grooves. As seen in FIG. 10 each of the grooves are chamfered on both sides of the floating nut to allow easy drainage of contaminants and water out of the floating nut.

The present invention has been described with reference to specific details of particular embodiments. It is not intended that such detailed be regarded as limitations upon the scope of the invention except insofar as and to the extent that they are included in the accompanying claims.

We claim:

1. A modular construction mat system comprising:
   a. a substantially rectangular upper layer mat having an upper layer top, an upper layer bottom, and a first plurality of walls extending downwardly from the upper layer bottom which define a plurality of upper layer enclosed cells;
   b. a substantially rectangular lower layer mat having a lower layer top, a lower layer bottom, a second plurality of walls extending upwardly from the lower layer top which define a plurality of lower layer mat enclosed cells, wherein the first plurality of walls of the upper layer mat are aligned with the second plurality of walls of the lower layer mat;
   c. a floating nut system for affixing the upper layer mat to the lower layer mat, wherein the mats are offset relative to one another such that two adjacent edges of the lower layer mat form a lower peripheral extension along two adjacent sides, and two edges of the upper layer mat form an upper peripheral extension along the remaining two sides, wherein the floating nut systems are used to affix the lower and upper mat peripheral extensions to create complete modular mat systems.

2. The modular construction mat system of claim 1 wherein the floating nut system comprises:

a. a bolt;
b. an upper layer mat floating nut retainer plate;
c. an upper layer mat captured floating nut;
d. a lower layer mat floating nut retainer plate; and
e. a lower layer mat captured floating nut.

3. The modular construction mat system of claim 2 wherein the upper layer mat captured floating nut and the lower layer mat captured floating nut has multiple chamfered grooves traversing the threads of the floating nut allowing drainage of contaminants and water out of the floating nut.

4. The modular construction mat system of claim 1 wherein a plurality of stanchions extends downwardly from the upper layer bottom, wherein the stanchions fit within some of the plurality of upper layer mat enclosed cells.

5. The modular construction mat system of claim 1 wherein a plurality of stanchions extends upwardly from the lower layer top, wherein the stanchions fit within some of the plurality of lower layer mat enclosed cells.

6. The modular construction mat system of claim 1 wherein an upwardly extruded feature traverses in one direction along some of the top edges of some of the plurality of lower layer enclosed cells; the upwardly extruded feature configured to be inserted into a corresponding receiving pocket traversing in the same direction along some of the bottom edges of some of the plurality of upper layer enclosed cells.

7. The modular construction mat system of claim 1 wherein a downwardly extruded feature traverses in one direction along some of the bottom edges of some of the plurality of upper layer enclosed cells; the downwardly extruded feature configured to be inserted into a corresponding receiving pocket traversing in the same direction along some of the top edges of some of the plurality of lower layer mat enclosed cells.

* * * * *